324-77.
4-9-74 XR 3,803,391
SR

United States Patent [19]
Vernet

[11] 3,803,391
[45] Apr. 9, 1974

[54] A REAL-TIME PROCESSING SYSTEM AND METHOD UTILIZING DISCRETE FOURIER TRANSFORM

[75] Inventor: Jean Louis Vernet, Paris, France

[73] Assignee: Thomson CSF, Paris, France

[22] Filed: Apr. 25, 1972

[21] Appl. No.: 247,476

[30] Foreign Application Priority Data
Apr. 27, 1971 France ............................ 71.14988

[52] U.S. Cl. ............................ 235/152, 324/77 B
[51] Int. Cl. ............................ G06f 15/34
[58] Field of Search ............ 235/152, 156; 328/165, 328/167; 324/77 B, 77 D

[56] References Cited
UNITED STATES PATENTS

| | | | |
|---|---|---|---|
| 3,529,142 | 9/1970 | Robertson | 235/181 |
| 3,584,781 | 6/1971 | Edson | 235/156 |
| 3,638,004 | 1/1972 | Sloane | 235/152 X |

*Primary Examiner*—Felix D. Gruber
*Assistant Examiner*—David H. Malzahn
*Attorney, Agent, or Firm*—Edwin E. Greigg

[57] ABSTRACT

A method of and device for carrying out real-time processing of electrical signals wherein, after sampling and quantizing the signals which are to be processed, real samples N are subjected to a pre-processing operation in a system in which a time sequence of said N samples of the processed signal is transformed into a sequence of N/2 complex samples $U_m$ applied to and processed in a F.F.T. iterative or repetitive algorithm computer unit of conventional design and mode of operation with N/2 points. The computer unit generates D.F.T. coefficients for which there is a symmetrical relationship between the even complex coefficients $C_{2q}$ and the related odd complex coefficients $C^*_{N-2q+2p+1}$.

6 Claims, 2 Drawing Figures

A REAL-TIME PROCESSING SYSTEM AND METHOD UTILIZING DISCRETE FOURIER TRANSFORM

BACKGROUND OF THE INVENTION

The invention is applicable in particular to spectral analysis or to filtering of the signals being studied and relates to improvements in methods of and devices for carrying out real-time processing of electrical signals.

It relates, more particularly, to methods which employ techniques of calculation of the discrete Fourier transform, "DFT," of time sequences made up of equidistant samples of said signals, in order to provide information relating to their frequency spectra. The information thus produced makes it possible to carry out real-time operations such as spectral analysis or filtering of the signals in question.

The invention provides an improved process and apparatus for real-time processing of real signals. Real signals are defined as, and intended to refer to, those signals whose frequency spectrum is symmetrical in relation to the zero frequency.

DESCRIPTION OF THE PRIOR ART

This recent field of application of computing techniques is described in numerous publications and in particular in articles published in "IEEE Transactions on Audio and Electro-acoustics," such as, for example, the articles "What Is Fast Fourier Transform," by W. T. Cochran et al., Vol. AU–15, No. 2, June 1967, pp. 45–55; "The Finite Fourier Transform," by J. W. Cooley et al.; and "A Radix-Eight Fast Fourier Transform Subroutine for Real-Valued Series," by G. D. Bergland, both of the latter articles appearing in a special issue of FFT, Vol. AU–17, No. 2, June 1969, at pp. 77 and 138, respectively.

Amongst the various techniques for computing the discrete Fourier transform of a time sequence of samples of an electrical signal, the most effective, particularly with respect to its speed of computation, is that known as "Fast Fourier Transform," "FFT," that is to say, the fast discrete Fourier transform. It essentially consists in utilizing iterative algorithms for carrying out real-time computation.

If the time sequence is made of up N samples of a real signal, the number of operations to be carried out is the same as for a time sequence of N complex samples and requires two N storage positions. However, because of certain inherent properties of real signals, and the redundancy of the information obtained by the computation of their discrete Fourier transform, this number of operations and therefore the number of requisite storage positions is unnecessarily excessive and it has been found that the number of operations can be reduced in order to make the processing of N real samples substantially equivalent to that of N/2 complex samples, as far as the computation time and the requisite storage capacity are concerned.

SUMMARY OF THE INVENTION

One object of the present invention is to describe a method of and a device for achieving a substantial economy, through the simplification effected, in the requisite computation time and in the equipment used.

To this end, after sampling and quantizing of the electrical signals being processed, in accordance with the present invention the N real samples are subjected to preliminary processing in a system whose function is to shift the frequency spectrum of the signals being processed from an odd whole number of half-steps of the sampling frequency, said sampling step being that of the DFT.

The pre-processed signals, supplied in the form of complex values, are then applied to and processed in an FFT unit for computation by iterative algorithm, of the conventional mode of operation with N/2 points.

In accordance with the present invention, the procedure of real-time processing of electrical signals is characterized essentially in that, firstly, by means of a pre-processing system there is translated from an odd whole number $2p+1$, positive or negative, of frequency-sampling half steps, the frequency spectrum of the real signal being processed. The sequence of the N real Nyquist samples $X_k$ of this signal is then transformed into a sequence of N/2 complex samples $U_m = [X_m-(-1)^p j X_{m+N/2}] \exp[-2\pi j m (2p+1)/2N]$. This new sequence is then supplied to a computing unit comprising N storage positions and producing at its output a succession of N/2 complex coefficients $c_{2q}$ representing both the DFT of the sequence of complex values $U_k$, and the complex amplitudes of N/2 lines of the frequency spectrum of the signal being processed, the N/2 other lines of said spectrum being derived from the said above-mentioned N/2 spectral lines by means of the symmetrical relationship $$C_{2q} = C^*_{N-2q+2p+1},$$ where $q$ is a whole number.

In accordance with another feature of the invention, the device for carrying out real-time processing of the electrical signals, and comprising FFT algorithm computer unit, said device employing the process hereinbefore described, is distinguished principally in that it comprises a pre-processing system which receives the quantized samples of the signal at its input and contains a store with two shift-registers having N/2 stages, in series, producing samples shifted in relation to one another by N/2 at their respective outputs which are connected to the corresponding inputs of a complex value multiplier also supplied with the complex multiplication values coming from a frequency synthesizer.

BRIEF DESCRIPTION OF THE DRAWINGS

Other features and advantages of the present invention will become apparent during the ensuing description, given by way of non-limitative example and relating to the attached figures in which.

DESCRIPTION OF THE PREFERRED EMBODIMENTS

As hereinbefore described, the fast Fourier transform or FFT is an efficient method of computing the discrete Fourier transform or DFT of a time sequence of discrete information samples. The present invention is based upon the utilization of this computing technique to its maximum advantage.

The complex coefficients $A_r$ of the discrete Fourier transform DFT of a time sequence of N equidistant samples $X_k$, known as Nyquist samples, of a quantized electrical signal, have the known mathematical form:

$$A_r=\frac{1}{N}\sum_{k=0}^{N-1} X_k \exp\left(-2\pi j\frac{rk}{N}\right) \quad (1)$$

in which

- $j=(-1)^{1/2}=\sqrt{-1}$ and where
- $A_r$ is the $r^{th}$ coefficient of D.F.T.; $r$ is a positive integer giving the order index; $r=0, 1, 2, \ldots N-1$ in the range of definition of $A_r$, sometimes called the "frequency" of D.F.T.;
- $X_k$ denotes the $k$ sample of the time series which consists of N samples;
- $k$ is an integer in the range defined by $k=0, 1, 2 \ldots N-1$.

Figure 1:
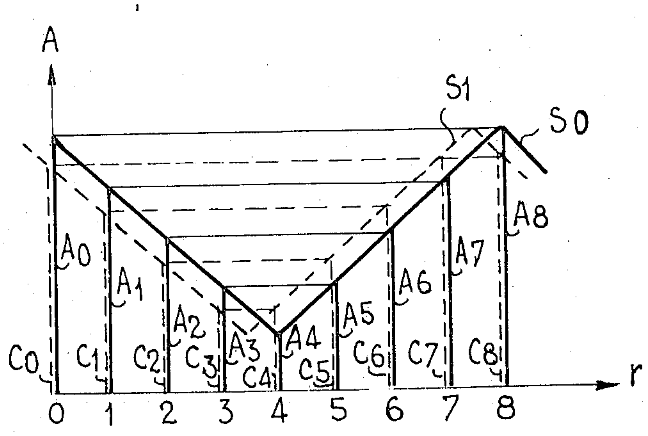
FIG. 1 is an amplitude spectral lines order graph showing a real signal whose frequency spectrum contains N equidistant, quantized samples.

In order to facilitate the understanding of the invention, there will now be described the amplitude-order graph of a real signal as shown in FIG. 1.

The graph shown in full line in FIG. 1 relates to the frequency spectrum $S_o$ of a real signal made up of N = 8 samples. This spectrum is defined by the N = 8 spectrum lines $A_o$ to $A_7$ which correspond to the N = 8 coefficients of the discrete Fourier transform of the time sequence of the N samples of this signal. As this graph shows and in accordance with the known properties of the discrete Fourier transform, the DFT of a time sequence of N samples is periodic and has a period of N. In addition, if the samples are from a real signal, the symmetrical condition $A_r = A^*_{N-r}$ is satisfied for any value of the index $r$, the * indicating the related complex value.

Of the N values $A_r$, as results from symmetrical conditions stated one half will suffice to fully define the frequency spectrum of the real signal being studied. This spectrum can thus for example be totally defined by the N/2 first coefficients $A_o$ to $A_{(N/2)-1}$.

Conventional FFT iterative algorithms do not enable the N/2 first coefficients to be computed independently of the N/2 others. However, they are well suited to the separate computation of the N/2 coefficients of odd order on the one hand, and the N/2 coefficients of even order, on the other. Among other things, they make it possible to compute exclusively one or the other of these two interleaved sequences of coefficients. However, neither of these sequences taken on its own is able of itself to define the whole of the spectrum of the signal being studied, because of the N/2 values which go to make it up, N/4 are redundant. In other words, the number N is generally advantageously made equal to $2^n$, where $n$ is a positive whole number, the indices $r$ and N−$r$ having the same parity so that the symmetrical condition hereinbefore defined applies to each of the two sequences, both even and odd.

The condition which has to be satisfied in order for one or the other of the two interleaved sequences of coefficients of even $C_{2q}$ and odd $C_{2q+1}$, order, to be able on its own to define the whole of the spectrum being studied, is that each term of one of them shall be Cto a corresponding term of the other. That is to say, the relationship $C_{2q} = C^{=}_{N-2q+2p+1}$, where $p$ is a positive or negative whole number, is satisfied for any value of the whole number $q$ ranging between 0 and N/4. The computation of the values of this kind of sequence is then capable of being carried out by means of a conventional FFT iterative algorithm.

It can be shown that this condition is satisfied, in accordance with the method of the invention, by subjecting the real input signal to a pre-processing stage by which the frequency spectrum of the real signal is shifted from an odd integer of one half step of the frequency sampling. This frequency shifting is carried out backward in frequency when $p$ is negative, and forward in frequency where $p$ is positive.

Then, the broken-line graph of FIG. 1 is obtained, in which the shifted spectrum $S_1$ is defined by the coefficients $C_0$ to $C_7$ in respect of which the symmetrical condition $C_{2q} = C^*_{N-2q+2p+1}$ is obtained, $p$ being for example equal to −1. It can be shown that overall this operation of frequency shifting of the time sequence of samples $X_k$, has not affected the definition of the spectrum at all and that the coefficients $C_{2q}$ can be determined by computing the discrete Fourier transform of a complex signal with N/2 samples $$U_m = [X_m - (-1)^p j X_{m+N/2}] \exp[-2\pi jm(2p+1)/2N]$$

where $m$ is an integer of the sample order with $0 \leqslant m \leqslant N/2-1$ The mathematical expression of these coefficients is then written as:

$$C_{2q}=\frac{1}{N}\sum_{m=0}^{N/2-1} U_m \exp\left(-2\pi j\frac{mq}{N/2}\right) \quad (2)$$

where $0 \leqslant q \leqslant N/4-1$

Figure 2:
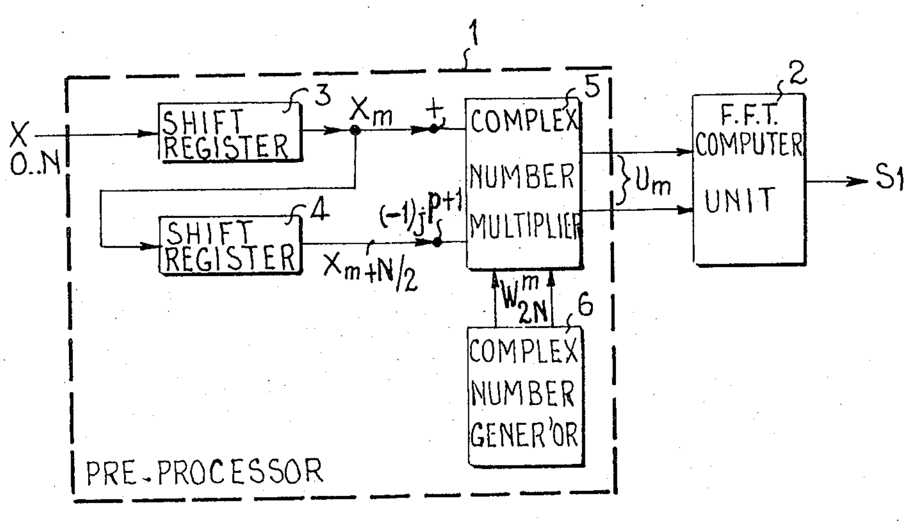
FIG. 2 is a block diagram of an embodiment of the device in accordance with the invention.

To implement the method of this invention, a device for processing real signals, in accordance with the invention, is shown in FIG. 2. In this device, the N samples X of the real signal being studied, are applied to an input terminal of a pre-processing system 1 and then passed through a computer unit 2 of conventional kind utilizing an FFT iterative algorithm. In the system 1, the N samples X are successively stored in a first shift-register 3 with N/2 stages, whose output terminal supplies the samples $X_m$ and is connected on the one hand to the + input of a complex value multiplier 5 and on the other hand to the input of a second shift-register 4 with N/2 stages, supplying $X_{m+N/2}$ at the output. The samples $X_m$ and $X_{m+N/2}$ simultaneously produced by the registers 3 and 4 are thus at an interval of N/2 samples from one another. The output of the register 4 is sonnected to the input $(-1)^{p+1}j$ of the complex multiplier 5 which also receives, from a generator 6, the complex values $W^m_{2N} = \exp[-2\pi j k (2p+1)/2N]$.

In multiplier 5, the complex values of the samples $X_m$ and $(-1)^{p+1} j X_{m+N/2}$ are multiplied by the complex values $W^m_{2N}$ in accordance with the mathematical operation $$[X_m + (-1)^{p+1} j X_{m+N/2}]\, W^m_{2N} = U_m.$$

The complex value generator 6 is a frequency synthesizer.

This kind of synthesizer is, for example, constituted by a non-destructive read-out store in which there are stored complex values W produced in a manner known per se. This store establishes a correspondence between a whole number $m$ ranging between 0 and $(N/2)-1$, produced by a counter, and a complex value $W^m_{2N}$ $= \exp[-2\pi j k(2p+1)/2N]$ said value then being applied to the complex value multiplier 5.

The output terminals of the multiplier 5 are connected to a conventional FFT algorithm computer unit 2, operating with N/2 points. Thus, the pre-processing system 1 described makes it possible to apply to the computing unit the N/2 complex values $U_m$ hereinbefore defined.

It should be noted that there are in existence computer units in which the complex number multiplier is already incorporated, for example, the computer described in copending U. S. application Ser. No. 101,281, filed Dec. 24, 1970, now U.S. Pat. No. 3,704,826, issued on Dec. 5, 1972. Further, the computer unit 2, multiplier 5 and synthesizer 6 may be of a well known type. For example, unit 2 and multiplier 5 may correspond to units 12 and 13, respectively of U. S. Pat. No. 3,573,446, while computing unit 2 may be of the type described in the aforementioned application Ser. No. 101,281.

In employing such apparatus, in order to implement the method of the present invention, the stages 3 and 4 of the registers N/2 are connected to the inputs of the complex value multiplier which forms part of the computer unit. With this kind of design, the two first computing iterations serve to perform the pre-processing function, $n-1$ iterations of N/2 complex sample each, being subsequently required for the computation of all the $C_{2q}$ values.

The invention, which has been illustrated by way of example here, in particular encompasses the computation of inverse discrete Fourier transforms which, because of the property of reciprocity of the operations described, is carried out in a manner similar to that used for direct transforms but in the inverse sense, which is the same as saying that the pre-processing function becomes a final processing function.

That which is claimed is:

1. A method of real-time signal processing for computing Fourier coefficients in real-time of an input signal having a frequency spectrum which is symmetrical in relation to zero frequency, said input signal corresponding to a time series of N discrete data points quantized samples X to be pre-processed and then applied and further processed in an associated F.F.T. computer unit operating with N/2 points, said method comprising, in combination, the steps of:

a. applying said input signal time series to a pre-processor input;

b. performing a time series frequency spectrum shift by a positive or negative odd integer $2p+1$ of one half step of the frequency sampling, thus transforming N real Nyquist samples $X_k$, $k$ being an integer index of the sample order with $0 \leq k \leq N-1$, by operating a first and a second pre-processor means, in a series of N/2 complex samples $$U_m = [X_m - (-1)^p j X_{m+N/2}] \exp.[-2\pi jm(2p+1)/2N]$$

where $X_m$ denotes the $m^{th}$ sample value of the time series which consist of N samples, $m$ is an integer index of the sample order with $0 \leq m \leq (N/2)-1$, $j = \sqrt{-1}$, and $p$ being a positive or a negative integer;

c. applying the formed series complex samples $U_m$ to respective inputs of a D.F.T. computer unit; and d. performing in said D.F.T. computer unit an operation generating a series of N/2 complex coefficients of even order $C_{2q}$, where 1 is an integer such as $0 \leq q \leq (N/4)-1$, representing both the D.F.T. of a series of said complex samples values $U_m$ and the complex amplitudes of N/2 frequency spectral lines of the signal under process, the odd order . . . N/2 spectral lines being calculated from the first mentioned N/2 lines by means of the complex conjugate symmetry about N/2 relation $C_{2q} = C^*_{N-2q+2p+1}$ with above defined integers q and $p$.

2. A real-time signal processing system for computing Fourier coefficients in real-time of an input signal having a frequency spectrum which is symmetrical in relation to zero frequency, the signal corresponding to a time sequence of N discrete data points quantized samples X, said system comprising, in combination:

a. a pre-processor receiving at its input terminal means N quantized samples X of real-time signal time series and having a first and a second processing means forming an input store including two series connected shift registers of a given storage capacity, said registers being connected to produce at their respective output samples shifted in relation to one another by N/2 samples;

b. a complex number computing means connected to said registers outputs and including a complex value multiplier and an associated complex number generator for producing at outputs from said multiplier formed time sequence of N/2 complex samples $U_m$; and c. a F.F.T. computer unit coupled to said complex computer means and responsive to signal outputs therefrom for operating with N/2 points generating Fourier coefficients.

3. A system as claimed in claim 2, wherein said complex number generator is a frequency synthetizer.

4. A real-time processing system as claimed in claim 2, wherein said pre-processor generates the time sequence of N/2 complex samples $U_m$, and said F.F.T. computer unit generates D.F.T. coefficients in which the even complex coefficients and the related odd complex coefficients of the D.F.T. are in a symetrical relationship.

5. A real-time processing system as claimed in claim 2, wherein each said shift register comprises N/2 stages.

6. A real-time signal processing system for computing Fourier coefficients in real time for an input signal having a frequency spectrum which is symmetrical in relation to the zero frequency, the signal corresponding to a time sequence of N discrete data points quantized samples X, said system comprising, in combination:

a. a pre-processor receiving at its input terminal means N quantized samples X of real-time signal time series and having a first and a second processing means forming an input store including two series connected shift registers of a given storage capacity, said registers being connected to produce at their respective outputs samples shifted in relation to one another by N/2 samples; and b. a computer means including an F.F.T. computer unit for further signal processing operating with N/2 points and generating the Fourier coefficients, said computer means further including a complex value multiplier and an associated complex number generator formed by a frequency synthetizer, the pre-processor shifted samples being coupled to inputs of said multiplier from said registers, and outputs of said multiplier being coupled to inputs of said F.F.T. computer unit, whereby the two first iterations of the computing operation in said computer means carries out pre-processing function iterations on complex samples required for computation of all even order coefficients values of the output signal.

* * * * *